(12) United States Patent
Edwards et al.

(10) Patent No.: US 12,070,870 B2
(45) Date of Patent: *Aug. 27, 2024

(54) SYSTEM AND METHOD FOR ADJUSTING THE OPENING OF CONTAINERS TO AVOID DAMAGE TO CONTENTS

(71) Applicant: Walmart Apollo, LLC, Bentonville, AR (US)

(72) Inventors: James Benjamin Edwards, Centerton, AR (US); Paul E. Durkee, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,547

(22) Filed: Sep. 22, 2023

(65) Prior Publication Data

US 2024/0009877 A1 Jan. 11, 2024

Related U.S. Application Data

(63) Continuation of application No. 18/151,537, filed on Jan. 9, 2023, now Pat. No. 11,794,370, which is a (Continued)

(51) Int. Cl.
*G06K 9/00* (2022.01)
*B26D 5/00* (2006.01)
(Continued)

(52) U.S. Cl.
CPC ............. *B26D 5/005* (2013.01); *B26D 5/007* (2013.01); *B65B 69/00* (2013.01);
(Continued)

(58) Field of Classification Search
CPC .... G06K 7/10366; G06K 7/1099; G06K 7/14; G06K 7/1404; G06K 7/1413;
(Continued)

(56) References Cited

U.S. PATENT DOCUMENTS 4,622,875 A 11/1986 Emery
5,040,116 A 8/1991 Evans, Jr.
(Continued)

OTHER PUBLICATIONS

Automatic Logistic Solutions; "Press Releases"; http://www.box-opening-system.com/info/press-releases/; Jul. 29, 2015; pp. 1-9.
(Continued)

*Primary Examiner* — Eric Rush
(74) *Attorney, Agent, or Firm* — Fitch, Even, Tabin & Flannery LLP (57) ABSTRACT

First scanned images of the first container are received from a scanning device that show the contents of the interior of the first container before the first container is cut and opened. Second scanned images that are of the contents of the first container after the first container is cut and opened are also received. The images are analyzed and, based upon the analysis, selective modifications to the operating parameters of the container opening machine are determined and made.

20 Claims, 10 Drawing Sheets

Related U.S. Application Data continuation of application No. 17/195,939, filed on Mar. 9, 2021, now Pat. No. 11,550,301, which is a continuation of application No. 16/854,492, filed on Apr. 21, 2020, now Pat. No. 10,955,826.

(60) Provisional application No. 62/837,269, filed on Apr. 23, 2019.

(51) Int. Cl.
| | |
|---|---|
| B65B 69/00 | (2006.01) |
| B65G 15/30 | (2006.01) |
| G05B 19/416 | (2006.01) |
| G06F 18/22 | (2023.01) |
| G06K 7/10 | (2006.01) |
| G06K 7/14 | (2006.01) |
| G06T 7/00 | (2017.01) |
| G06T 7/60 | (2017.01) |
| G06T 7/70 | (2017.01) |
| G06V 10/75 | (2022.01) |
| G06Q 10/08 | (2023.01) |

(52) U.S. Cl.
CPC ...... *B65B 69/0008* (2013.01); *B65B 69/0033* (2013.01); *B65G 15/30* (2013.01); *G05B 19/416* (2013.01); *G06F 18/22* (2023.01); *G06K 7/10366* (2013.01); *G06K 7/1413* (2013.01); *G06T 7/001* (2013.01); *G06T 7/60* (2013.01); *G06T 7/70* (2017.01); *G06V 10/75* (2022.01); *B26D 2005/002* (2013.01); *G05B 2219/37087* (2013.01); *G06Q 10/08* (2013.01); *G06T 2207/30108* (2013.01); *G06T 2207/30112* (2013.01)

(58) Field of Classification Search
CPC ........ G06V 10/70; G06V 10/74; G06V 10/75; G06V 20/52; G06V 20/60; G06V 20/64; G06V 2201/06; G06F 18/20; G06F 18/22; G06F 18/24; G06T 7/0002; G06T 7/0004; G06T 7/001; G06T 7/60; G06T 7/70; G06T 2207/20084; G06T 2207/30108; G06T 2207/30112; B65B 57/00; B65B 59/00; B65B 59/001; B65B 59/003; B65B 59/005; B65B 59/02; B65B 69/00; B65B 69/0008; B65B 69/0025; B65B 69/0033; B26D 5/00; B26D 5/005; B26D 5/007; B26D 2005/002; B65G 15/30; G06Q 10/08; G06Q 10/083; G06Q 10/0832; G05B 19/416; G05B 2219/36053; G05B 2219/36199; G05B 2219/37087
See application file for complete search history.

(56) References Cited

U.S. PATENT DOCUMENTS

| | | | |
|---|---|---|---|
| 5,423,649 A | 6/1995 | Maeda | |
| 7,720,567 B2 | 5/2010 | Doke | |
| 7,769,221 B1 | 8/2010 | Shakes | |
| 8,113,427 B2 | 2/2012 | Ross | |
| 8,463,428 B2 | 6/2013 | Doke | |
| 8,494,672 B2 * | 7/2013 | Chirnomas | G06Q 30/0641 700/215 |
| 8,507,821 B2 | 8/2013 | Varghese | |
| 8,783,143 B2 | 7/2014 | Kollman | |
| 8,805,565 B2 | 8/2014 | Izaki | |
| 9,412,099 B1 | 8/2016 | Tyree | |
| 9,421,642 B2 * | 8/2016 | Kieburg | B23K 26/38 |
| 9,457,474 B1 | 10/2016 | Lisso | |
| 9,663,261 B2 | 5/2017 | Azad | |
| 9,686,481 B1 | 6/2017 | Graybill | |
| 9,926,094 B2 | 3/2018 | Dugat | |
| 10,063,814 B2 | 8/2018 | Wood | |
| 10,719,801 B2 | 7/2020 | Quan | |
| 10,955,826 B2 | 3/2021 | Edwards | |
| 11,032,017 B2 | 6/2021 | Raichelgauz | |
| 11,331,758 B2 | 5/2022 | Hawkins | |
| 11,407,589 B2 | 8/2022 | Wagner | |
| 11,550,301 B2 | 1/2023 | Edwards | |
| 11,794,370 B2 | 10/2023 | Edwards | |
| 2001/0003939 A1 | 6/2001 | Liu | |
| 2006/0217838 A1 | 9/2006 | Sugino | |
| 2010/0298973 A1 | 11/2010 | Doke | |
| 2012/0175222 A1 | 7/2012 | Fourney | |
| 2015/0058178 A1 | 2/2015 | Chirnomas | |
| 2015/0119216 A1 | 4/2015 | Benterman | |
| 2016/0016684 A1 | 1/2016 | Dugat | |
| 2017/0015456 A1 | 1/2017 | Stapfer | |
| 2018/0038805 A1 | 2/2018 | Heikkilae | |
| 2019/0355201 A1 | 11/2019 | Stapfer | |
| 2020/0124484 A1 | 4/2020 | Fuller | |
| 2020/0156257 A1 | 5/2020 | Sage | |
| 2020/0339298 A1 | 10/2020 | Edwards | |
| 2020/0341453 A1 | 10/2020 | Edwards | |
| 2021/0191366 A1 | 6/2021 | Edwards | |
| 2023/0146024 A1 | 5/2023 | Edwards | |
| 2023/0241695 A1 | 8/2023 | Edwards | |

OTHER PUBLICATIONS

Heinz Mayer GMBH; "Sensitive Box Cutter"; https://sensitive-box-cutter.de/en_US/; available on Wayback Machine as of Feb. 22, 2015; 1 page.

Machinedesign; "Automated Box Openers Reduces Warehouse Accidents"; https://www.machinedesign.com/industrial-automation/automated-box-openers-reduces-warehouse-accidents; Oct. 25, 2018; pp. 1-5.

PCT; App. No. PCT/US2020/029098; International Search Report and Written Opinion mailed Jul. 23, 2020.

PCT; App. No. PCT/US2020/029237; International Search Report and Written Opinion mailed Jul. 28, 2020.

TM Robotics; "Automated box opening robots"; https://www.tmrobotics.com/box-opening-solutions/#drawer1_link; available at least as early as Apr. 8, 2019; pp. 1-3.

TM Robotics; "The IBOD System: Intelligent Box Opening Solutions"; https://www.youtube.com/watch?v=MLPq4QvgSE4; published on Apr. 17, 2016; pp. 1-3.

U.S. Appl. No. 16/854,492; Notice of Allowance mailed Nov. 19, 2020; (pp. 1-16).

U.S. Appl. No. 16/854,427; Non-Final Rejection mailed Aug. 30, 2022; (pp. 1-6).

U.S. Appl. No. 16/854,427; Notice of Allowance and Fees Due (PTOL-85) mailed Jan. 12, 2023; (pp. 1-8).

U.S. Appl. No. 17/195,939; Notice of Allowance and Fees Due (PTOL-85) mailed Sep. 13, 2022; (pp. 1-14).

U.S. Appl. No. 18/151,537; Notice of Allowance and Fees Due (PTOL-85) mailed Jun. 21, 2023; (pp. 1-13).

\* cited by examiner

SYSTEM AND METHOD FOR ADJUSTING THE OPENING OF CONTAINERS TO AVOID DAMAGE TO CONTENTS

CROSS REFERENCES TO RELATED APPLICATIONS

This application is a continuation of U.S. application Ser. No. 18/151,537, filed Jan. 9, 2023, which is a continuation of U.S. application Ser. No. 17/195,939, filed Mar. 9, 2021, which is a continuation of U.S. application Ser. No. 16/854,492, filed Apr. 21, 2020, which claims the benefit of U.S. Provisional Application No. 62/837,269, filed Apr. 23, 2019, all of which are incorporated herein by reference in their entireties.

TECHNICAL FIELD

These teachings relate to opening containers such as boxes without damaging the contents of the container.

BACKGROUND

Boxes, crates, cases, and other types of containers are used to ship various types of products. The containers may arrive at a warehouse, distribution center, or retail store and need to be opened. In one example, the containers are opened manually. However, in other examples and when large number of containers are shipped and received, a cutting or opening machine is used to remove the top of the container (or otherwise open the container). Once opened, the contents of the container can be removed, for example, by a robot or by a human.

The containers are typically opaque and, consequently, the contents are not visible either to a human or machine opening the container. Since the cutting or opening machine is unaware of the contents or how the contents are arranged, the cutting or opening process may result in damage to the contents of the container. For example, a cutting machine that removes the top of a shipping case may also cut off a portion of an item that is being shipped in the shipping case.

BRIEF DESCRIPTION OF THE DRAWINGS

The above needs are at least partially met through the provision of approaches that opens containers, wherein.

DETAILED DESCRIPTION

Generally speaking, the present approaches use optical sensors to scan a container after it has been cut and opened to determine if there was damage to the contents of the container and provide feedback to a cutting apparatus or system; the feedback is used to adjust the cutting and/or opening algorithms of the cutting apparatus or system (sometimes referred to as "container opening system" herein). These approaches are directed to scanning the container before the container is opened, then scanning the container again after the container is opened in order to determine whether the opening of the container via the cutting apparatus or system is responsible for any damage to the items stored inside the case, then readjusting the settings of the cutting apparatus and system if damage to the contents is detected and the cause is related to the settings.

Further, image analysis recognizes the damage type as a damage having been caused by the opening process. Other types of damage (e.g., such as crushing) would not have been caused by the blade or laser. Also, if damage occurs but the case was deformed, poorly positioned, etc., then the poor result may not have been caused by the automated opening process and thus no iteration or change to the cutting algorithm may be necessary. For this, image analysis is performed on the container's pre-opening state to verify dimensions and positions.

In other aspects, a comparison is made between pre- and post-cut shapes by using millimeter wave technology. If the items in the container after the cutting process is performed are not shaped like the ones seen in images before cutting was performed, then there may have been blade damage. Conversely, if the objects in the container are damaged, but the millimeter wave technology sees the same shape in the pre-opening scans, the damage was likely not caused by the automated opening process, and thus no iteration of parameters of the cutting algorithm is required.

In yet other aspects, a damaged condition is determined by comparing a captured image to a baseline image of an undamaged image. This may apply when the cutting tool used is a laser, knife blade or saw. In the case of laser, there may be burn or scorch marks on an otherwise undamaged product.

In still other aspects, a "grading" of damage is made, where the damage is determined to be non-detrimental when the product is not ideal but could still be sold, or it may be detrimental, and the item needs to be discarded. For example, a dark mark may be present on the shipping container that only visually damages the packaging, versus a through burn that renders it unsellable. Damage only to packaging is often non-fatal or detrimental to the product within the packaging.

In other examples, the system may have preprogrammed images of what the damage situations would show, in order to more confidently identify a state of contents having been damaged. For example, damage to a box of breakfast cereal may show several small toruses in the post-decant imagery, whereas damages to pancake syrup would show an irregularly shaped flat object (a puddle).

In still other examples, one of the parameter iterations may involve a vertical location of the cut on the case. The direction of the move of the cut location (up or down) may be dependent on the geometry seen of the product inside. The tendency will typically be to move the cut toward a narrow portion of the product, when available. An example is a salad dressing bottle. When able, the cut should be moved to the portion of the case where the neck location of the bottle is where the product is farther from the inner surface of the case, in order to reduce risk to the product in opening.

In still other examples, if post-opening and/or post-decant imagery shows unclean lines indicating tearing of the cardboard, then the cut adjustment should be for a deeper blade penetration or stronger intensity laser. Other examples are possible.

In other aspects, post-case-cutting, with known and stored cut parameters are also used. Item damage can be determined by analysis of images obtained after the container is opened. If damage is determined to exist, iterative changes are made to the parameters of the cutting algorithm of the container opening machine. In examples, the parameters iterated depend on the type of damage seen. For example, if a box of breakfast cereal is cut open and small pieces are captured by the camera, the blade penetration will be iterated to be shallower (the parameter related to this is set to be shallower). In other examples, if the container (e.g., case) does not open, then iterate the parameter related to blade depth to be deeper.

In many of these embodiments, a system for opening a container includes a scanning surface; a plurality of containers (that arrive and are sequentially placed on the scanning surface and include a first container and a second container); a scanning device; and a database.

The system also includes a container opening machine with at least one cutting tool. The cutting tool is one or more of a saw or a laser and is applied to each of the plurality of containers arriving on the scanning surface wherein the container opening machine is operated and the container cut and opened by the container opening machine according to one or more operating parameters.

The control circuit is coupled to the database, the scanning device, and the container opening machine. The control circuit is configured to receive first scanned images of the first container from the scanning device, the first scanned images being of the contents of the interior of the first container before the first container is cut and opened, and second scanned images being of the contents of the first container after the first container is cut and opened.

The control circuit is also configured to, based upon the comparing, determine existence of damage to the contents of the first container and based upon an analysis of the damage, selectively determine a modification to the operating parameters of the container opening machine.

The control circuit is further configured to apply the modified parameters to the container opening machine. The container opening machine opens the second container using the modified operating parameters.

In aspects, the analysis for damage compares shapes of the items in the first container before and after the first container is opened. In other aspects, after the analysis for damage is conducted, a determination is made that there are no changes to the operating parameters of the container opening machine.

In examples, the operating parameters include one or more of: the cutting depth of the tool, the location of the cut, and the shape of the cut. Other examples are possible.

In other examples, the changes to the operating parameters comprise changes to one or more parameters that change of the type of cutting tool that is used. In still other examples, the analysis for damage classifies the damage among a plurality of categories. In yet other examples, the analysis for damage indicates that the shapes of the items in the first container changed indicating that the cutting tool has damaged items in the first container.

In other aspects, the database stores images of undamaged items which are used in the analysis for damage. In other examples, the scanning surface is a conveyor belt. Other examples are possible.

In others of these embodiments, a scanning surface, and a plurality of containers that arrive and are sequentially placed on the scanning surface are provided. The containers include a first container and a second container. A scanning device and a database are also provided.

A container opening machine is provided that includes at least one cutting tool. The cutting tool is one or more of a saw or a laser. The cutting tool is applied to each of the plurality of containers arriving on the scanning surface wherein the container opening machine is operated and the container cut and opened by the container opening machine according to one or more operating parameters.

At a control circuit, first scanned images of the first container are received from the scanning device. The first scanned images are of the contents of the interior of the first container before the first container is cut and opened. The control also receives second scanned images that are of the contents of the first container after the first container is cut and opened.

At the control circuit, based upon the comparing, the existence of damage to the contents of the first container is determined. At the control circuit, based upon an analysis of the damage, a selective modification to the operating parameters of the container opening machine is determined. The modified parameters are applied by the control circuit to the container opening machine. The container opening machine opens the second container using the modified operating parameters.

Figure 1:
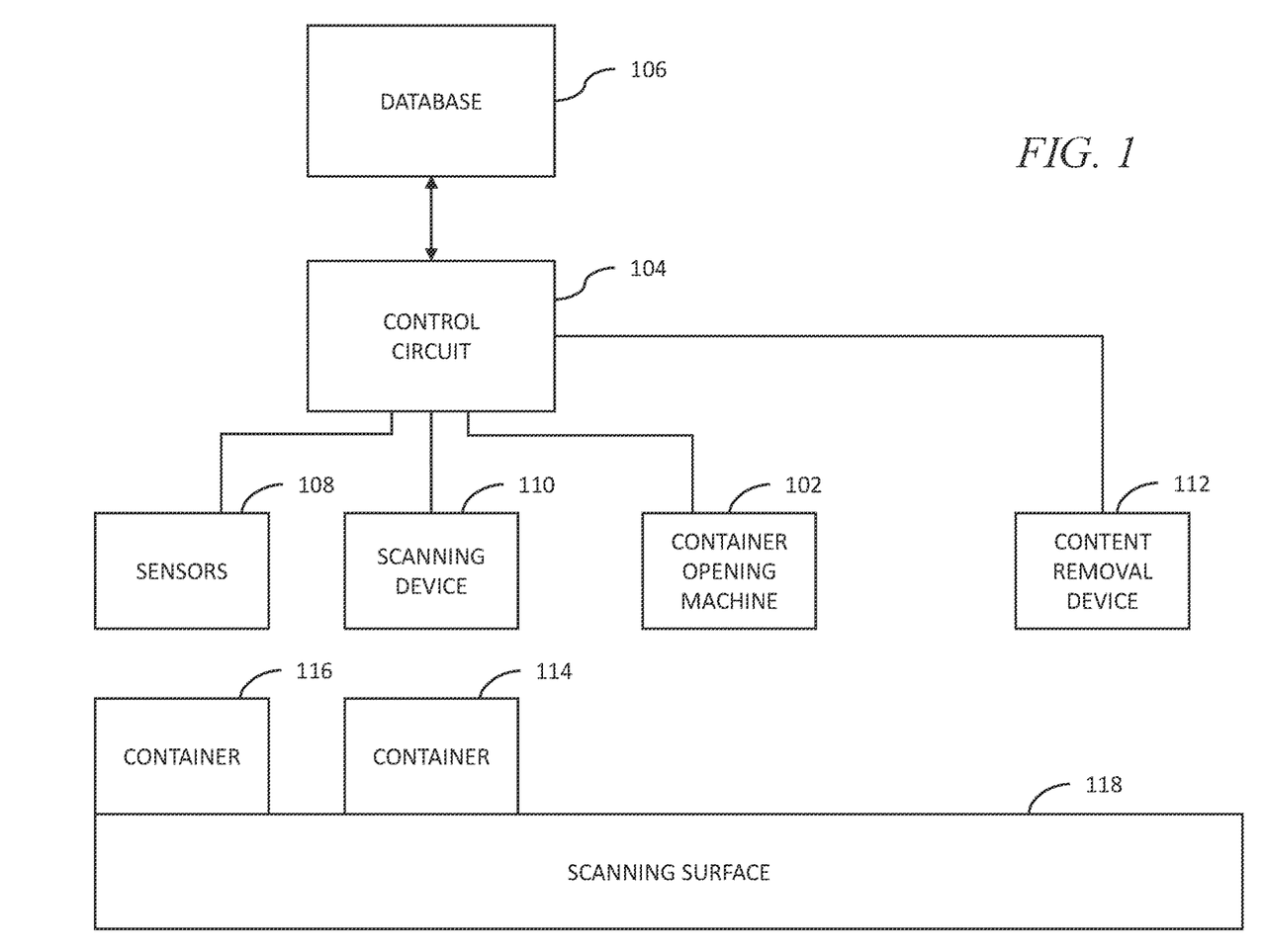
FIG. 1 comprises a diagram of a system as configured in accordance with various embodiments of these teachings.

Referring now to FIG. 1, a system 100 is configured to open one or more containers. The system 100 includes a container opening machine 102, a control circuit 104, a database 106, sensors 108, a scanning device 110, a content removal device 112, a first container 114, a second container 116, and a scanning surface 118. Some or all of these elements may be disposed at a warehouse, retail store, or discount center. Other examples are possible. In one particular example, the elements are all disposed of at a warehouse so that large amounts of data do not have to be moved to or between networks (e.g., the cloud).

The container opening machine 102 is any type of device or combination of devices that are effective to open (e.g., cut, slash, pierce, and/or remove portions of) the containers 114 and 116. The container opening machine 102 includes one or more cutting tools (e.g., lasers, circular saws, reciprocating saws, other saws, drills, blades, knives, or other types of tools). The cutting tools may be disposed on a robotic arm that moves about the container. The operation of the container opening machine 102 may be controlled by parameters stored at the container opening machine 102. For example, the container opening machine 102 may itself have a control circuit that is operated according to stored parameters or values. One stored value (parameter) may represent the cutting tool (or tools used), another value (parameter) may relate to the depth of a cut, other parameters may specify the shape of a cut, and still other parameters may describe other details of the cut or how to obtain the cut. These parameters may be stored at a memory at the container opening machine 102 in any type of data storage format. It will be appreciated that the container opening machine 102 may have its parameters reset upon the opening of each different container.

In other examples, a model (e.g., a convolutional neural network (CNN) model may represent containers and the cutting patterns. The CNN model may be stored in the database 106. In aspects, the CNN model is first trained with training data from various containers. The training alters the layers, weights, and other parameters of the model. After the training process is completed, a particular container is scanned to obtain images of its contents, and a label (or other identifier) on the particular container is scanned (e.g., to obtain information that may not be determined by image analysis such as the monetary value of items in the container). Information obtained from the images and/or the label is applied to the CNN model to obtain a pattern that can be used by the container opening machine to open the particular container. One or more CNN models can be used. In other examples, the model may be a series of equations, a flowchart (implemented as computer code), or other elements.

In aspects, when the containers 114 and 116 are opened, a cutting pattern is used to perform or make the opening. By pattern, it is meant one or more of: the location of cuts in or at the container, the dimensions (length, width, depth) of the cuts, the amount of force applied to the cuts (e.g., when the tool is a saw), the intensity of the laser beam (when the cutting tool is a laser), and the amount of time the tool is used. In other aspects, the pattern also includes the identity of the tool (or tools used), when these tools are used, and how these tools are used (e.g., one tool may be used to open one portion of a container and another tool used to open another portion of a container). Other examples are possible.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 104 may be configured (for example, by using corresponding programming stored in a memory as will be well understood by those skilled in the art) to carry out one or more of the steps, actions, and/or functions described herein.

The database 106 is any type of electronic memory storage device or computer memory. The sensors 108 are any type of sensors that read information from the containers 114 and 116. For example, the sensors 108 may be RFID (or label) sensors that read RFID tags (or labels such as barcodes) on the containers 114 and 116. The tags or labels have associated with the containers 114 and 116 have associated information. For example, a label may be encoded with information including the type of items in a container, the value of items in a container, the number of items in a container, the dimensions of items in a container, or any other characteristic of items in a container. The information may also uniquely identify the container (e.g., the label may be a barcode with a container ID). This information may be of the type difficult or impossible to obtain via image analysis (e.g., information such as a precise monetary value of the items in a container).

The scanning device 110 is any type of scanning device that obtains images of the contents of the container 114 and container 116. In aspects, the scanning device 110 obtains images using millimeter wave technology (obtaining images to identify the shape and orientation of the products or items in the container 114 and 116). Other examples (e.g., that obtain images in other radiation frequencies) such as x-rays may also be used. In examples, the scanning device 110 transmits millimeter waves from antennas. The wave energy reflected back from the container and the contents of the containers 114 and 116 is used to construct images, which can be analyzed by the control circuit 104. In still other examples, the scanning device may use one technology (millimeter wave) to image the container and its contents before opening, and another (e.g., visible light) after opening.

The content removal device 112 is any type of device or combination of devices that can removed the contents of the containers 114 and 116. In examples, the content removal device 112 may be a robot with arms, levers, and grips that are operated to remove the contents of the containers 114 and 116 once the containers are opened.

The first container 114 and the second container 116 are any type of structure that holds items, for example, as the items are shipped from a first location to a second location. The containers 114 and 116 may have walls that are opaque in that humans or machines cannot see into the containers and cannot ascertain the contents of the containers. In other words, the contents of the containers are ordinarily hidden without using images obtained by the canning device 110. In examples, the containers may be cardboard container, constructed of metal, or constructed of plastic. Other examples are possible. Various types of items may be shipped in the containers. For example, bottles, cans, other boxes, and various other items may be placed in the containers 114 and 116.

The scanning surface 118 may be any type of surface such as a flat surface where the containers 114 and 116 can be disposed as the containers are opened. In other aspects, the scanning surface 118 is a conveyor belt that sequentially moves the containers 114 and 116 over time. For example, the conveyor belt first moves the container 114 to a first position, and the scanning device 110 obtains a first image of the contents. The container opening machine 102 opens the container 114. The scanning device 110 obtains a second image of the contents of the container 114. Based upon the first image, the second image, and other information it is determined whether the contents of the container have been damaged. If the contents have been damaged, a cause of the damage is determined. If the determined cause relates to the operation of the container opening machine 102, then the operation of the container opening machine 102 is adjusted. This may be effected by altering operating parameters of the container opening machine 102 such as the cutting tool used, the shape cut by the selected tool, and the amount of force applied by the tool to mention a few examples. Any type of operational parameter, feature, or operating characteristic of any type of container opening machine may be adjusted.

In one example of the operation of the system of FIG. 1, the containers 114 and 116 arrive at a product distribution or a product sales facility are opened by cutting them with a blade or a laser with the container opening machine 102. In situations, where the products are packed tightly and closely to the carton/cardboard side walls of the containers 114 and 116, the blade that cuts the case open may also cut into and damage the product or the packaging of the product stored inside the containers 114 and 116. When containers 114 and 116 are opened and damaged products are detected, a determination is made as to whether the damage to the product/product packaging in the containers 114 and 116 was inflicted prior to or during the packing of the products into the case, or during the container opening process by the container opening machine 102.

Since the containers 114 and 116 are typically made from an opaque (i.e., non-see-through) material, the scanning device 110 (e.g., using millimeter wave technology) obtains images, which are analyzed to identify the shape of products (including exterior surfaces) and the orientation of the products within the containers 114 and 116. Then, after the containers 114 and 116 are opened (e.g., using a blade or a laser from the container opening machine 102), the opened container is scanned again by the scanning device 110 for the purpose of detecting any item damage that may have occurred during the opening of the container 114 and 116 by the blade or the laser.

If products or items in the containers 114 and 116 are determined to be damaged after the containers 114 and 116 are opened, the control circuit 104 compares the pre-opening image to the post-opening image to detect any anomalies associated with item damage (e.g., a cut or deformation on a product is not visible on any of the items on the pre-container opening scan, but visible on one or more items on the post-opening scan). For example, if the post-opening scan shows that one or more of the items is not shaped like the ones seen in the pre-opening scan, then the control circuit 104 would interpret that to be indicative of blade or laser damage during the opening of the container 114 or 116. Conversely, if one or more items in the case is damaged, but the item looks identical in the pre-opening and post-opening scans, the system would interpret that to be indicative of damage occurring during (or prior to) the packaging of the item(s) into the containers 114 and 116, and no iteration/variation of the case-cutting parameters of the container opening machine is warranted.

In other aspects, the control circuit 104 may be configured to determine whether the damage to an item is detrimental (i.e., the item can no longer be sold in this condition and must be discarded), or non-detrimental (i.e., the damage is not ideal (e.g., a spot/dark mark on packaging, but the item could still be sold). In examples, the database 106 stores images of what undamaged products look like in order to facilitate easier detection of damaged items in the pre-opening and post-opening scan images.

In other aspects, a "grading" of damage is made by the control circuit 104 (or in other examples, by a human). The damage is classified into categories, for example, detrimental or non-detrimental. Non-detrimental damage is when the item or product is not ideal but could still be sold, and detrimental is when the item needs to be discarded. For example, images may be examined for a dark marks on the shipping container that are burn marks for lasers and only indicate visual damage to the packaging. Damage only to packaging is often non-fatal or detrimental to the product within the packaging. On the other hand, images can be examined to see if the laser completely burned-through the package thereby rendering the item unsellable. Various types of image processing approaches can be used (e.g., comparing the obtained images to known images of burned containers). Once the type of damage is determined (e.g., small burn mark or complete burn-through of the container), then rules can be applied and an action taken (small burn indicates keeping the product to sell, burn through results in the item being physically discarded). It will be appreciated that other types of grading are possible.

Figure 2:
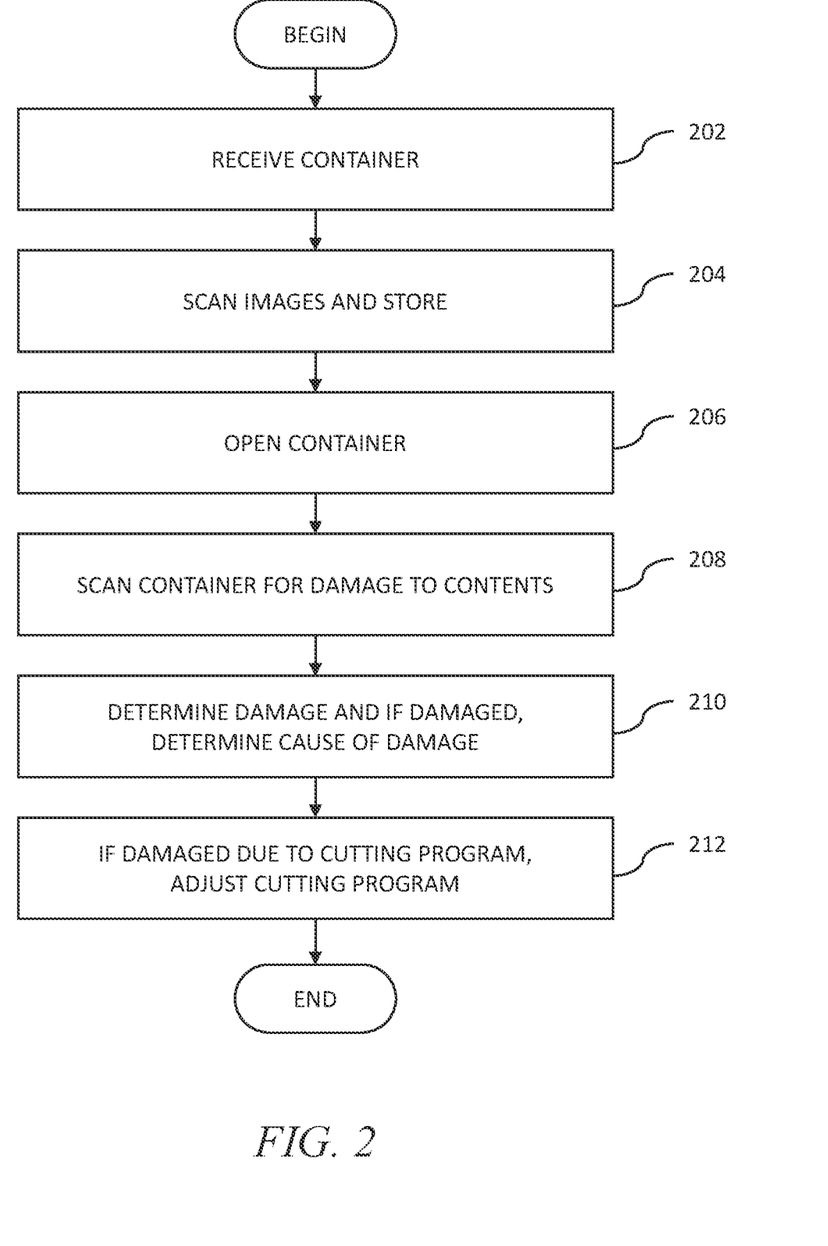
FIG. 2 comprises a flowchart as configured in accordance with various embodiments of these teachings.
Figure 3A:
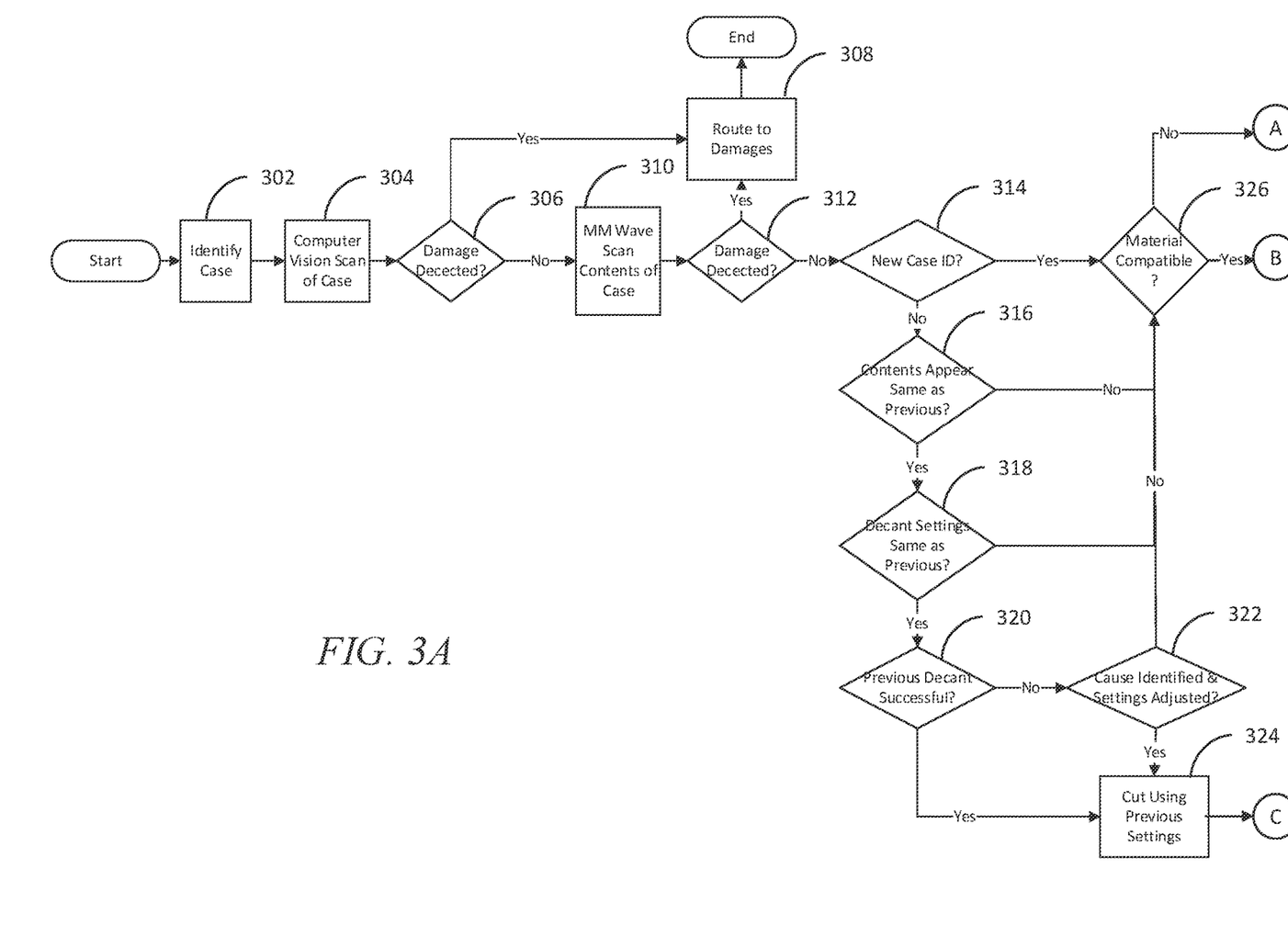
FIGS. 3A, 3B, 3C, and 3D comprise diagrams of an approach as configured in accordance with various embodiments of these teachings.
Figure 3B:
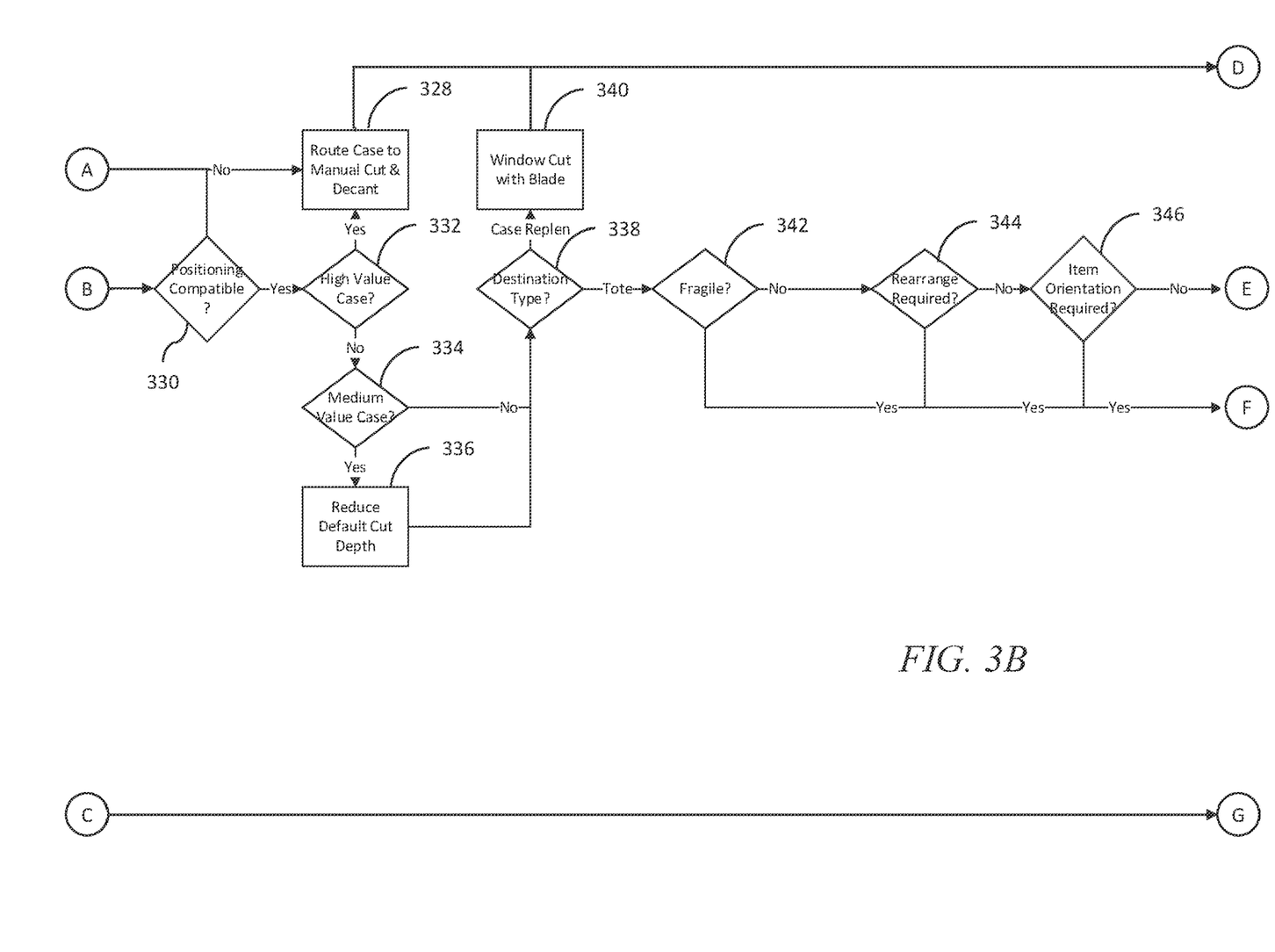
Figure 3C:
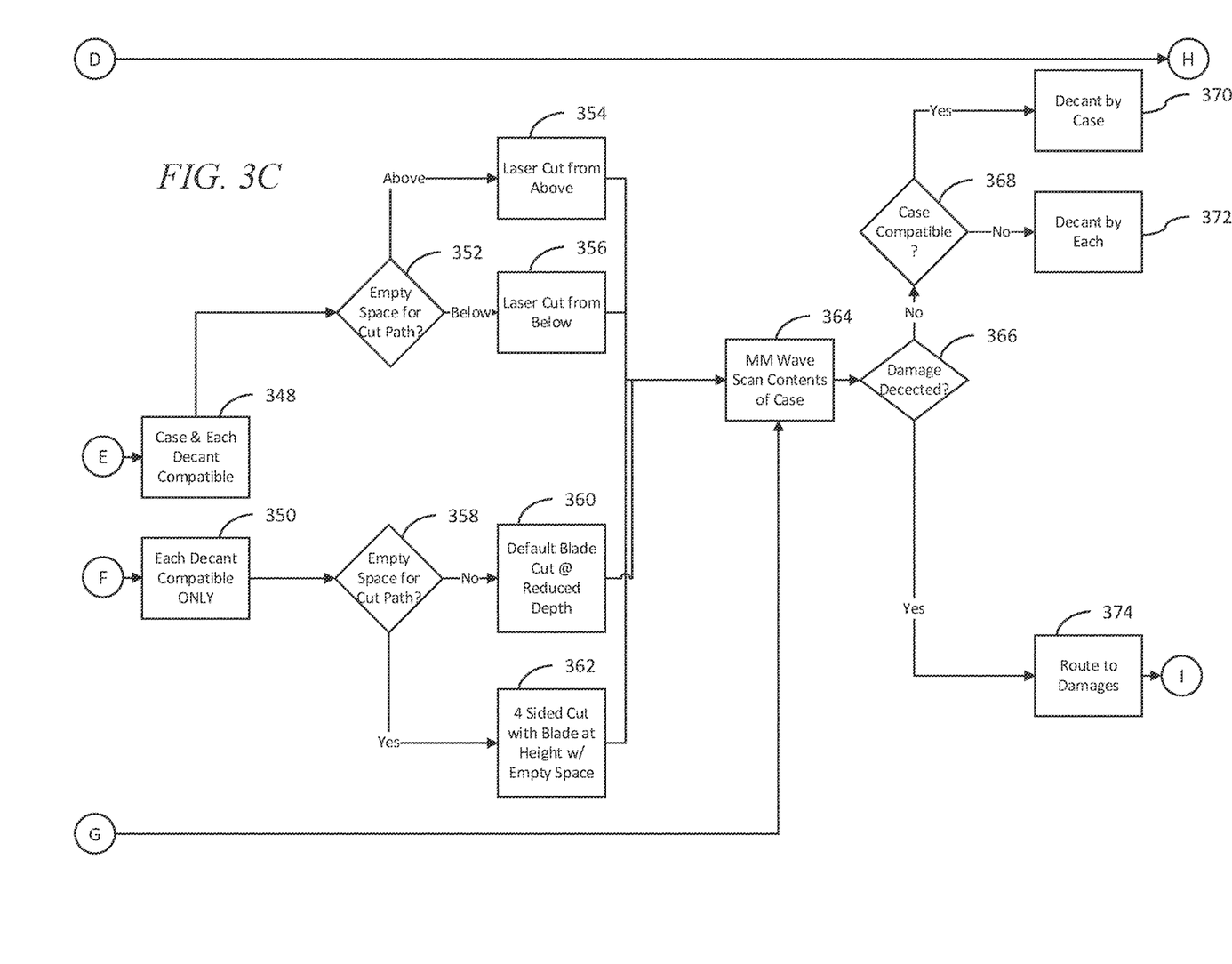
Figure 3D:
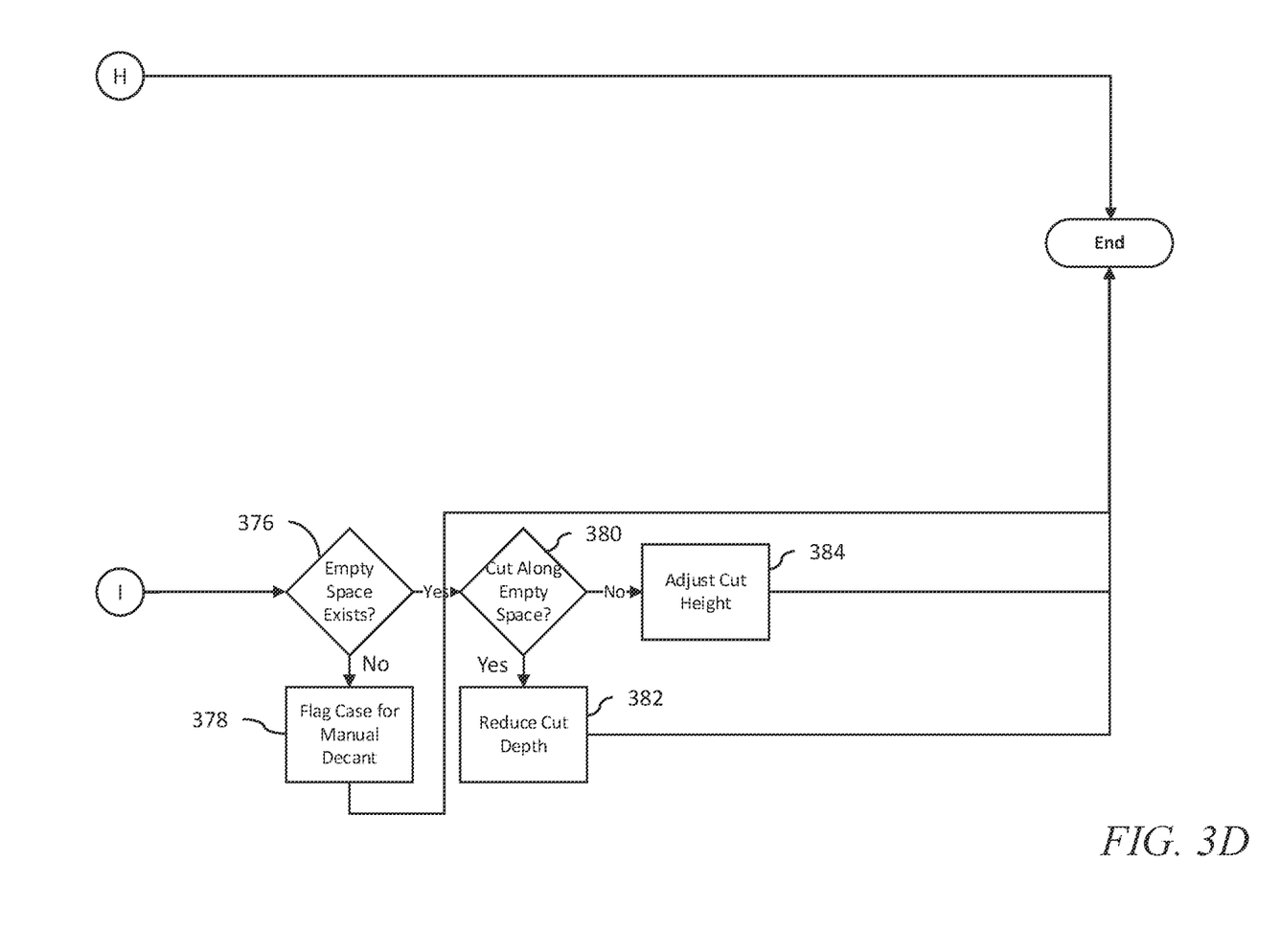

Referring now to FIG. 2, one example of an approach for adjusting the cutting or opening of a container based on damage is described. At step 202, the container arrives, for example on a conveyor belt or other scanning surface. This may be at the shipping location or at the destination (e.g., the same location where the container is opened).

At step 204, images of the container are scanned and stored in a database or memory. At step 206, the container is opened with a container opening machine. At step 208, images are obtained. These images may be obtained by the same or different technology used to obtain the images of the container before the container was opened. To take one example, millimeter wave technology may be used to obtain the images of the container's contents before the container is opened, and a camera that images in the visible light spectrum used to obtain images of the contents of the container after the container is opened. Combinations of instruments may also be used.

A determination of whether the contents damaged is made at step 210. This may be made by, for example, comparing images of undamaged items to those of damaged items. Also at step 210, if damaged, a cause for the damage is also determined. For example, if the item is crunched, the item may be determined to have not been damaged due to opening. On the other hand, if a piece of an item is missing, the damage may be determined to have been caused by the opening. These determinations can be made by a set of rules that can be implemented as a mathematical model (e.g., a CNN model, an algorithm, or a look-up table).

At step 212, if the damage is due to the opening, the cutting program used to open the container can be adjusted. For example, parameters can be adjusted that affect the operation of a container opening machine.

Referring now to FIG. 3, one example of a decantation process (how the contents are opened and removed from a container) is described. It will be appreciated that the cut method is the method used for cutting or opening as case such as annual, a robotic arm with a blade, or a laser to mention a few examples. It will be understood that the cut type is the type of cut applied to the case such as a window-type cut (e.g., such as a window opening on any structure for case replenishment, or a 4-sided cut). "Decant method" refers to how the contents of the case are removed from the case such as dumping. Further, it will be appreciated that the terms "container" and "case" are used interchangeably herein. It will additionally be understood that the various ones of these steps may be performed by a control circuit that is analyzing images or processing other inputs. Furthermore, the contents of cases may be disposed in product totes, which are containers that can be used to store, transport, and/or display products to customers in retail stores.

At step 302, the case or container is identified. In one example, a label on the container is read and in another example, an RFID tag is read. The information read may include information that identifies the container (e.g., has a container number or other identifier that uniquely identifies the container and other information such as the contents of the container or the monetary value of the contents).

At step 304, a computer vison scan of the case or container is made. The scan obtains images (e.g., in visible light) that shows damage to the case.

At step 306 and based, for example on the scan of step 304, it is determined if the case is damaged. If the answer is affirmative, execution continues at step 308 where the case is physically routed and moved to a damage processing area, where, for example, a determination can be made as to whether to dispose of the case. Execution then ends.

If the answer at step 306 is negative, at step 310 a scanner obtains images using millimeter sensing technology to scan through the opaque walls of the container to identify, for example, the shape, disposition, and other information regarding the contents of the case or container.

At step 312 and based, for example on the scan of step 310, it is determined if the contents of the case are damaged. If the answer is affirmative, execution continues at step 308 as described above. If the answer is negative, then execution continues with step 314.

At step 314, it is determined if the case associated with a new case identifier (a case not processed before). If the answer is affirmative, execution continues at step 326. If the answer is negative, execution continues at step 316.

At step 316, it is determined whether the contents appear to be the same as they were at a previous time. If the answer is negative, execution continues with step 326. If the answer is affirmative, execution continues with step 318.

At step 318, it is determined whether the decant settings (e.g., all inputs for decanting a case, for instance the type of tote the contents were placed) appear to be the same as they were at a previous time. If the answer is negative, execution continues with step 326. If the answer is affirmative, execution continues with step 320.

At step 320, it is determined whether the previous decant (removal of the contents) at a previous time was successful. If the answer is negative, execution continues with step 322. If the answer is affirmative, execution continues with step 324.

At step 322, it is determined if the cause for the unsuccessful decant was identified and the settings adjusted. If the answer is negative, then execution continues at step 326. If the answer is affirmative, then execution continues at step 324.

At step 324, the cutting of the container is made with the previous settings. Execution continues at step 364.

At step 326, it is determined if the material of the case is compatible with the tools used to remove or cut the case. If the answer is negative, execution continues at step 328 and if the answer is affirmative, execution continues with step 330.

At step 328, the case is routed to be manually cut and decanted. Execution then ends.

At step 330, it is determined if the position of the contents is compatible with the cutting tools, cutting pattern, or other cutting parameter to be used. If the answer is negative, then, step 328 is executed as described above. If the answer is affirmative, step 332 is executed.

At step 332, it is determined if the case or its contents is of high value (e.g., each of the contents or all of the contents together have a monetary value above a threshold). If the answer is affirmative, step 328 is executed as described above. If the answer is negative, execution continues with step 334.

At step 334, it is determined if the case or contents have a medium value (e.g., each of the contents or all of the contents together have a monetary value between a first and a second threshold). If the answer is affirmative, step 336 is executed. If the answer is negative, execution continues with step 338.

At step 336, the cutting depth is reduced. At step 338, the destination type is determined. The destination type specifies whether the case is being replenished as a full case or whether the contents are being removed to be placed in a tote. If the destination is a tote, step 342 is executed. If the destination is not a tote, but to simply use the case as a full case to display or present the products, then step 340 is executed. At step 340, a window cut (to show the products) is made to the container with a blade. Execution then ends.

At step 342, a determination is made if the case or items in the case are fragile. If the answer is affirmative, then execution continues with step 350. If the answer is negative, execution continues with step 344. This information can come from analyzing container images, human input, or from label information from the container.

At step 344, a determination is made as to whether the items in the case need to be rearranged. If the answer is affirmative, execution continues with step 350. If the answer is negative, execution continues with step 346.

At step 346, a determination is made as to whether the items in the case need to be reoriented. If the answer is affirmative, execution continues with step 350. If the answer is negative, execution continues with step 348.

At step 348, the contents of the case can dump (by a human or a robot) into a tote without a special procedure. Next, at step 352, a determination is made as to whether there is empty space in the container for the cut path of a cutting tool. If the answer is empty space exists at the top of the container (above), step 354 is executed where a cut from above is selected; if the answer is there is empty space at the bottom of the container, at step 356 a cut from below is used is used. Execution continues at step 364.

At step 350, the contents of the case are dumped (by a human or a robot) into a tote individually in a specified manner. At step 358, a determination is made as to whether there is empty space in the container for the cut path of the cutting tool. If the answer is negative, step 360 is executed where a default blade cut reduced depth is used; if the answer is affirmative, at step 362 a four-sided cut with a blade at a height within the empty space is used. Execution continues at step 364.

At step 364, a millimeter wave scan is made of the case and the contents is made. At step 366, it is determined if damage to the case or contents exists. If the answer is negative, execution continues with step 368. If the answer is affirmative, execution continues with step 374.

At step 368, it is determined if the case is compatible with dumping the contents (by a human or a robot) into a tote. If the answer is affirmative, at step 370, the entire contents of the case are dumped into the tote. If the answer is negative, at step 372, the contents of the case are put (decanted) into the tote individually, one-by-one.

At step 374, the case is routed to a damage processing area. Next, at step 376, a determination is made if empty space exists in the case. If the answer is negative, at step 378, the case is flagged for manually decanting and execution ends.

If the answer is affirmative at step 376, at step 380 a determination is made as to whether to cut along the empty space. If the answer is affirmative, cut depth is reduced and execution ends. If the answer is negative, the height of the cut is adjusted and execution ends.

Figure 4:
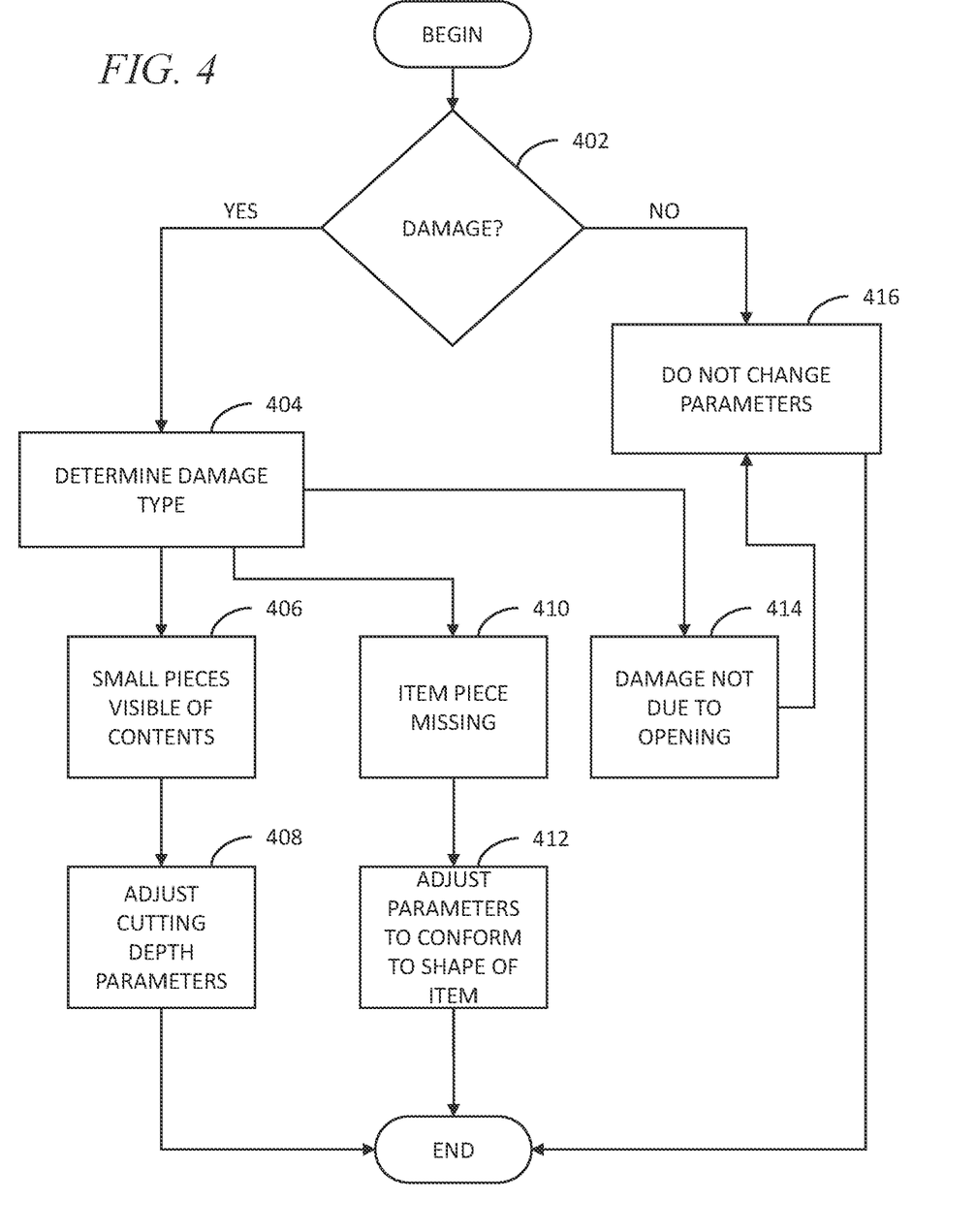
FIG. 4 comprises a diagram of a system as configured in accordance with various embodiments of these teachings.

Referring now to FIG. 4, one example of an approach for adjusting a cutting algorithm based on damage to contents of a container is described. It will be understood that this is one example of such an approach and that other examples are possible. At step 402, it is determined if damage to the contents of the container exists. If the answer is negative, at step 404, the parameters of a container opening machine are not changed. If the answer is affirmative, at step 404 the type of dame is determined. The type of damage can be determined, for example, by image analysis of images obtained of the damaged items. For instance, images of the damaged items are compared against images of items having known damage types. In this example, the determined types are small portions missing, a piece missing, and the item is crushed.

At step 406, the analysis indicates the existence of small visible pieces of item contents. For example, small pieces of the items are detected by image analysis to be at the bottom of the container. As a result, the depth parameters of the cutting is adjusted at step 408. Execution then ends.

At step 410, the analysis indicates that a piece of an item is missing. For example, a bottle-shaped item may be missing the top of the bottle. As a result, the cutting parameters are adjusted to take into account the shape of an item at step 412. Execution then ends.

At step 414, it is determined that the damage is not due to opening the container. For example, image analysis indicates that items are smashed or crunched. Execution then continues with step 416.

In examples, one example of an approach that determines a pattern to open containers is described. This approach may in part be implemented by a container opening machine that uses a pattern to open a container. Using the approaches described elsewhere herein, a determination is made as to whether the container opening machine caused the damage and that the pattern should be changed to avoid damage to the contents of containers in the future. In other words, the approaches of FIGS. 1-4 are used to adjust the cutting/opening algorithm provided in FIGS. 5-7.

Figure 5:
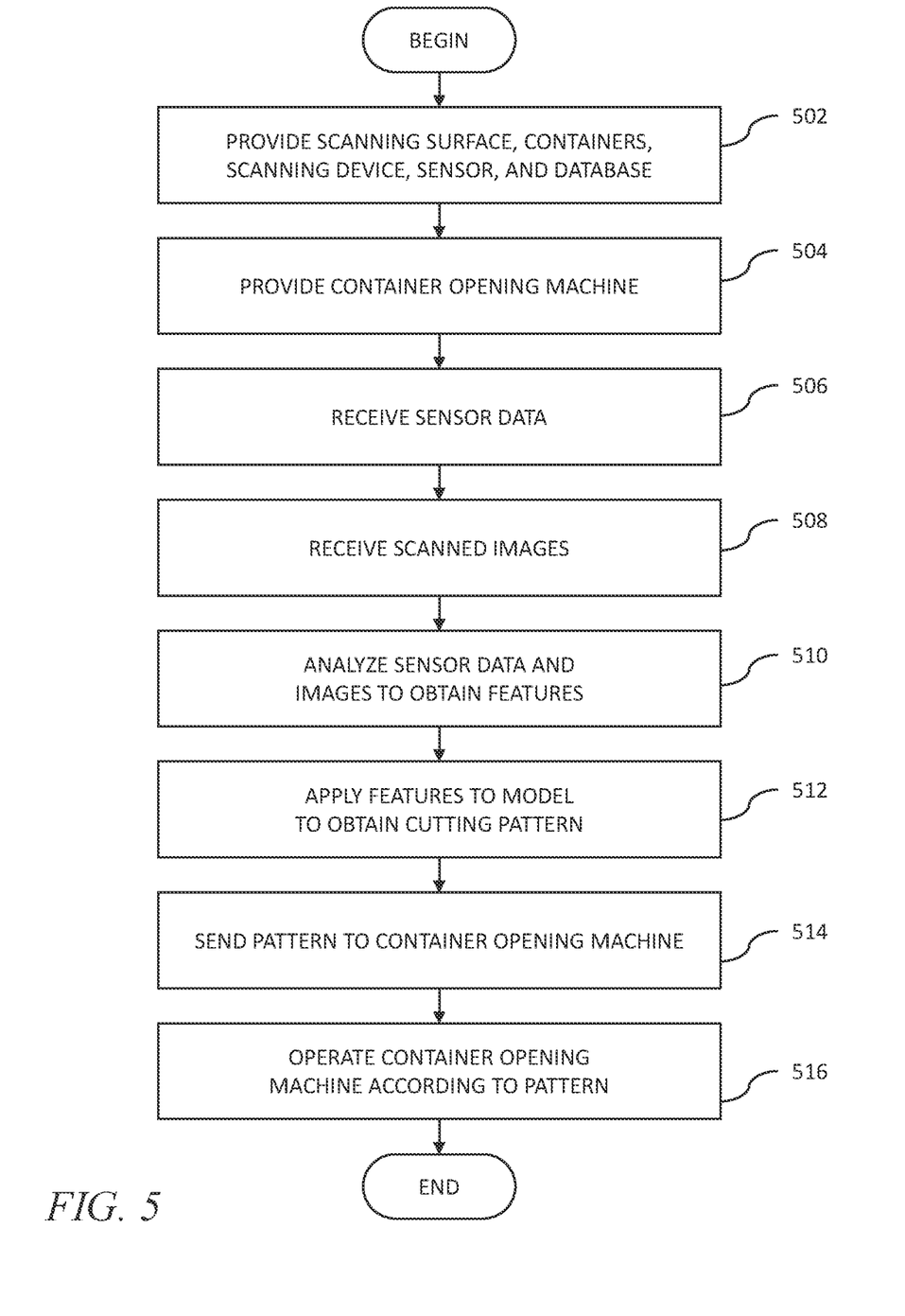
FIG. 5 comprises a flowchart as configured in accordance with various embodiments of these teachings.

Referring now to FIG. 5, one example of an approach for opening and removing the contents of containers is described. At step 502, a scanning surface, a plurality of containers (that arrive and are sequentially placed on the scanning surface), a scanning device, a sensor and a database that stores a mathematical model are provided. At step 504, a container opening machine that includes at least one cutting tool is also provided. The cutting tool is one or more of a saw blade or a laser. The cutting tool is applied to each of the plurality of containers arriving on the scanning surface to open the container.

At step 506 and at a control circuit, sensor data is received from the sensor. The sensor data identifies the contents of the container and/or uniquely identifies the container. At step 508 and at the control circuit, scanned images are received from the scanning device. The scanned images are of the contents of the interior of the container. In one example, the scanned images are obtained using millimeter sensing technology.

At step 510 and at the control circuit, the sensor data and the scanned images are analyzed to obtain features of the contents of the container. Image processing techniques known to those skilled in the art can be used to discern from the images features of the container and/or items in the container. These features may include one or more of: the dimensions of the contents, the spacing of the contents, the shape of the contents, the size of the contents, the number of contents in the container, the monetary value of the contents, the orientation of the contents, the material from which the container or contents is constructed, or other characteristics of the contents and/or the container.

At step 512 and at the control circuit, the features are applied to the mathematical model to produce a cutting pattern. In one example, the model is a CNN model. In other examples, the model is an algorithm implemented as computer code that is executed by a control circuit. Other examples of models are possible. In aspects, the cutting pattern specifies which of the one or more cutting tools is to be used and the location of where cuts are to be made. Other types of information and parameters can also be supplied by the pattern.

At step 514, the control circuit sends or transmits the cutting pattern to the container opening machine. The sending may be accomplished across any wired and/or wireless communication link.

At step 516, the container opening machine is operated and the container cut and opened by the container opening machine according to the cutting pattern.

Figure 6:
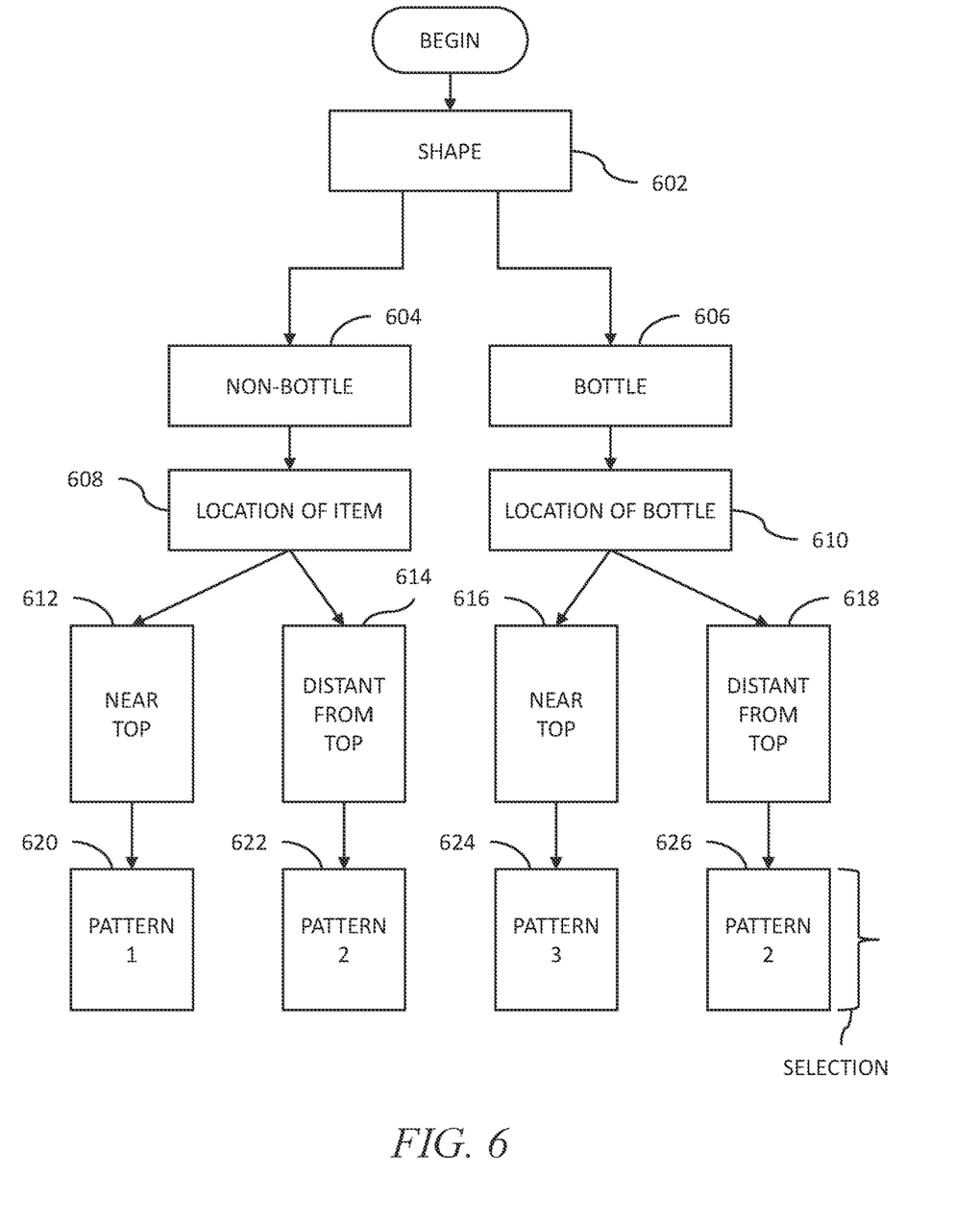
FIG. 6 comprises a diagram of a system as configured in accordance with various embodiments of these teachings.

Referring now to FIG. 6, one example of determining a cutting pattern is described. The example of FIG. 6 is, in aspects, a model implemented as an algorithm (or a lookup table) but it will be appreciated that it could also be implemented as a CNN model.

At step 602, image analysis determines that a shape of an item is a non-bottle shape 604 or a bottle shape 606. Image analysis also indicates locations 608 and 610 of the items in a container as being near the top of the container (labeled as 612 and 616) or distant from the top of the container (by a predetermined distance and labeled as 614 and 618). Based upon the item shape and location, specific cutting patterns (labeled as 620, 622, 624, and 626) are selected.

In one example, a non-bottle shape near the top selects pattern 620 (pattern 1). In another example, a non-bottle shape distant from the top selects pattern 622 (pattern 2). In yet another example, bottle shape near the top selects pattern 624 (pattern 3). In still another example, a bottle shape distant from the top selects pattern 626 (pattern 2). The patterns 1, 2, and 3 are unique combination of parameters that set the operation of the container opening machine (e.g., the container opening machine 102) as described elsewhere herein.

Figure 7:
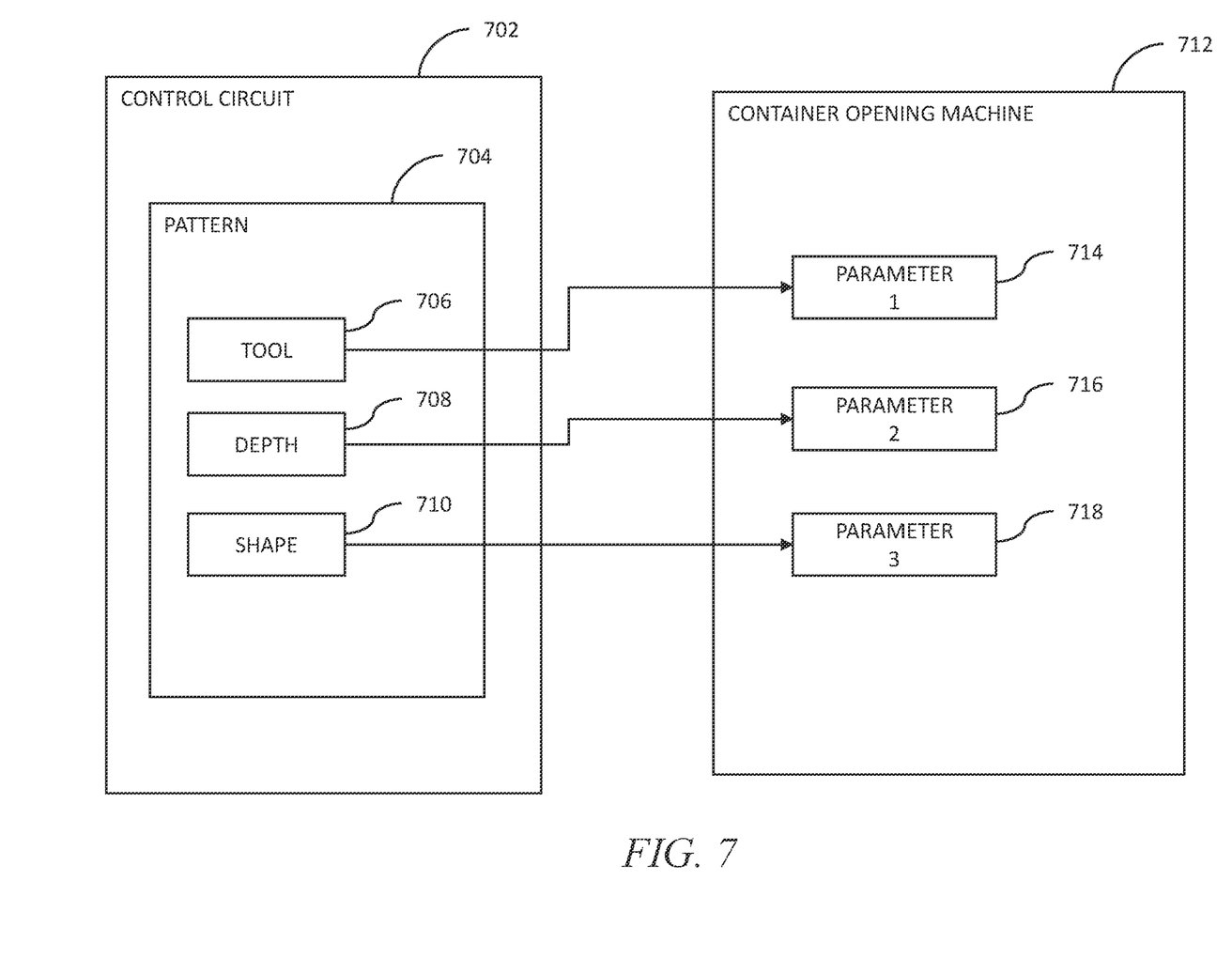
FIG. 7 comprises a diagram of a system as configured in accordance with various embodiments of these teachings.

Referring now to FIG. 7, one example of mapping a pattern to parameters on a container opening machine is described. A control circuit 702 generates a cutting pattern 704. The cutting pattern 704 has first feature 706 (specifying the cutting tool or tools used, e.g., a saw), a second feature 708 (specifying a cutting depth); and a third feature 710 (specifying a cutting shape).

The features 706, 708, and 710 are mapped to container opening machine 712. More specifically, the first feature 706 maps to a first parameter 714; the second feature 708 maps to a second parameter 716; and the third feature 710 maps to a third parameter 718. In examples, the parameters 714, 716, and 718 are implemented as memory locations that have values that are set (and are changed as the patterns change). In operation, the container opening machine 712 utilizes these values to use, direct, and control a cutting tool that opens a container.

In some embodiments, one or more of the exemplary embodiments include one or more localized IoT devices and controllers (e.g., included with or associated with the various scanners, sensors, cameras, or robots described herein). In another aspect, the sensors, cameras, or robots may be seen as an IoT device. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KM includes a continuously utilized near term source of data, but KM may be discarded depending upon the degree to which such KM has any value based on local processing and evaluation of such KM. In an exemplary embodiment, KRI may not even be utilized in any form if it is determined that KM is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for opening a container, the system comprising:
    an automated cutting tool configured to cut or open each of a plurality of containers according to one or more operating parameters; and
    a control circuit coupled to the automated cutting tool, wherein the control circuit is configured to:
        receive sensed information regarding contents of a first container after the first container is opened or cut by the automated cutting tool;
        analyze the sensed information and based upon the analyzing, determining a modification to the one or more operating parameters of the automated cutting tool; and
    apply the modified one or more operating parameters to the automated cutting tool, wherein the automated cutting tool opens or cuts a second container using the modified one or more operating parameters.

2. The system of claim 1, wherein the sensed information comprises images.

3. The system of claim 1, wherein the analyzing comprises determining damage to the contents of the first container.

4. The system of claim 3, wherein determining the damage compares shapes of the contents in the first container before and after the first container is opened or cut.

5. The system of claim 3, wherein after determining the damage is conducted, a determination is made that there are no changes to the one or more operating parameters of the automated cutting tool.

6. The system of claim 3, wherein determining the damage classifies the damage among a plurality of categories.

7. The system of claim 3, wherein determining the damage indicates that shapes of the contents in the first container changed indicating that the automated cutting tool has damaged contents in the first container.

8. The system of claim 3, wherein images of undamaged items are used in determining the damage.

9. The system of claim 1, wherein the one or more operating parameters include one or more of: a cutting depth of the automated cutting tool, a location of a cut, and a shape of a cut.

10. The system of claim 1, wherein the modification to the one or more operating parameters comprises changes to one or more parameters that change a type of cutting tool used.

11. A method for opening a container, the method comprising:
    providing an automated cutting tool configured to cut or open each of a plurality of containers according to one or more operating parameters;
    at a control circuit:
        receiving sensed information regarding contents of a first container after the first container is opened or cut by the automated cutting tool;
        analyzing the sensed information and based upon the analyzing, determining a modification to the one or more operating parameters of the automated cutting tool; and
    applying the modified one or more operating parameters to the automated cutting tool, wherein the automated cutting tool opens or cuts a second container using the modified one or more operating parameters.

12. The method of claim 11, wherein the sensed information comprise images.

13. The method of claim 11, wherein the analyzing comprises determining damage to the contents of the first container.

14. The method of claim 13, wherein determining the damage compares shapes of the contents in the first container is opened or cut.

15. The method of claim 13, wherein after determining the damage is conducted, a determination is made that there are no changes to the one or more operating parameters of the automated cutting tool.

16. The method of claim 13, wherein determining the damage classifies the damage among a plurality of categories.

17. The method of claim 13, wherein determining the damage indicates that shapes of the contents in the first container changed indicating that the automated cutting tool has damaged contents in the first container.

18. The method of claim 13, wherein images of undamaged items are used in determining the damage.

19. The method of claim 11, wherein the one or more operating parameters include one or more of: a cutting depth of the automated cutting tool, a location of a cut, and a shape of a cut.

20. The method of claim 11, wherein the modification to the one or more operating parameters comprises changes to one or more parameters that change a type of cutting tool used.

* * * * *

UNITED STATES PATENT AND TRADEMARK OFFICE
CERTIFICATE OF CORRECTION

| | | |
|---|---|---|
| PATENT NO. | : 12,070,870 B2 | Page 1 of 1 |
| APPLICATION NO. | : 18/371547 | |
| DATED | : August 27, 2024 | |
| INVENTOR(S) | : Edwards et al. | |

It is certified that error appears in the above-identified patent and that said Letters Patent is hereby corrected as shown below:

In the Claims

In Column 14, Claim 11, Line 18, delete "at" and insert -- and at --, therefor.

In Column 14, Claim 14, Lines 36-37, delete "first container" and insert -- first container before and after the first container --, therefor.

Signed and Sealed this
Tenth Day of December, 2024

Katherine Kelly Vidal
*Director of the United States Patent and Trademark Office*